United States Patent
Kabat et al.

(10) Patent No.: US 8,196,187 B2
(45) Date of Patent: Jun. 5, 2012

(54) RESOURCE STATE TRANSITION BASED ACCESS CONTROL SYSTEM

(75) Inventors: Jack Kabat, Sammamish, WA (US); Vadim Meleshuk, Seattle, WA (US); Alexander T. Weinert, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 727 days.

(21) Appl. No.: 12/163,782

(22) Filed: Jun. 27, 2008

(65) Prior Publication Data

US 2009/0222881 A1 Sep. 3, 2009

Related U.S. Application Data

(60) Provisional application No. 61/032,564, filed on Feb. 29, 2008.

(51) Int. Cl.
*G06F 21/00* (2006.01)
(52) U.S. Cl. .................. 726/4; 726/17; 726/21
(58) Field of Classification Search .......... 726/1, 2, 726/16, 17, 21, 26–30
See application file for complete search history.

(56) References Cited

U.S. PATENT DOCUMENTS

| | | | |
|---|---|---|---|
| 6,131,166 A * | 10/2000 | Wong-Insley | 713/300 |
| 7,124,192 B2 | 10/2006 | High, Jr. et al. | |
| 7,185,192 B1 * | 2/2007 | Kahn | 713/155 |
| 7,209,902 B2 | 4/2007 | Stefik et al. | |
| 7,249,379 B2 | 7/2007 | Larsen | |
| 7,302,634 B2 | 11/2007 | Lucovsky et al. | |
| 7,308,704 B2 | 12/2007 | Vogel et al. | |
| 2002/0026592 A1 | 2/2002 | Gavrila et al. | |
| 2004/0003293 A1 | 1/2004 | Viets et al. | |
| 2004/0186836 A1 | 9/2004 | Schlesinger | |
| 2005/0138419 A1 | 6/2005 | Gupta et al. | |
| 2005/0262099 A1 * | 11/2005 | Manfredi et al. | 707/10 |
| 2007/0261102 A1 | 11/2007 | Spataro et al. | |
| 2008/0005115 A1 | 1/2008 | Corley et al. | |
| 2009/0222882 A1 | 9/2009 | Kabat | |

OTHER PUBLICATIONS

Chander Ajay, et al., "A State-Transition Model of Trust Management and Access Control", Proceedings of the 14th IEEE workshop on Computer Security Foundations, 2001, 17 pages.

Zhang, Cui-xiao, et al., "Task-Role Based Dual System Access Control Model", IJCSNS International Journal of Computer Science and Network Security, vol. 6 No. 7B, Jul. 2006, pp. 211-215.

\* cited by examiner

*Primary Examiner* — Gilberto Barron, Jr.
*Assistant Examiner* — Malcolm Cribbs
(74) *Attorney, Agent, or Firm* — Workman Nydegger

(57) ABSTRACT

Enforcing access control based on resource state. A method includes receiving a request for an operation on one or more objects stored on computer readable media. One or more pre-operation states of the one or more objects are determined. One or more post-operation states of the one or more objects are determined. One or more access control rules are referenced. The access control rules control access to resources based on pre-operation state and post operation state. It can then be determined that the one or more access control rules allow the operation to succeed based on the one or more pre-operation states and the one or more post operation states. Based on determining that the one or more access control rules allow the operation to succeed, the operation is allowed to succeed.

19 Claims, 8 Drawing Sheets

Management Policy Rule Creation

Configure the general information about the management policy.

General Information 202

Operation and Users

Condition Before

Condition After

Policy Workflows

Name* ___204___

Description ___206___

Permissions ___208___

☑ Grants Permissions

* Indicates a required field

Finish    <Previous    Next>    Cancel

Management Policy Rule Creation

Configure the operation, users and attributes for this policy.

| General Information |
|---|
| Operation and Users _210_ |
| Condition Before |
| Condition After |
| Policy Workflows |

Operation*
Select the operation type for this rule.
_214_

- ☑ Create
- ☑ Delete
- ☐ Read
- ☑ Modify
- ☑ Modify Insert
- ☑ Modify Remove

Principals*
Configure who this rule applies to.

_216_

○ Specific Set of Users
Principal is defined as the following user set.

[ Browse ]

● Specific Set of Users
Principal is defined as the following user set.

Browse attributes of: [ All Objects ▼ ]   [ Browse... ]

Attributes
Select the object attributes for the rule.

_218_

○ All Attributes
Rule applies to all attributes of the resource

● Sellect specific attributes
Rule applies to selected attributes

Browse attributes of: [ All Objects ▼ ]   [ Browse... ]

_212_

[ Finish ]   [ <Previous ]   [ Next> ]   [ Cancel ]

* Indicates a required field

*FIG. 2B*

Management Policy Rule Creation

Configure the condition before the operation occurs. These settings apply to Read, Modify and Delete operations.

General Information

Operation and Users

Condition Before 220

Condition After

Policy Workflows

Resource Definition*
Configure the set the resource object must belong before the operation defined in this policy rule is applied.

○ Specific Set of Objects
Resource must part of the following object set.

[ ] [Browse]

● Relative To Principal
Resource is defined as an attribute of principal.

Browse attributes of: [All Objects ▼] [Browse...]

[_____] — 212

* Indicates a required field

[Finish] [<Previous] [Next>] [Cancel]

RESOURCE STATE TRANSITION BASED ACCESS CONTROL SYSTEM

CROSS-REFERENCE TO RELATED APPLICATIONS

This application claims the benefit of U.S. Provisional Application 61/032564 titled "RESOURCE STATE TRANSITION ACCESS CONTROL AND UNIFIED MANAGEMENT POLICY" filed on Feb. 29, 2008, which is incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

In computing systems, access to resources can be controlled by an access control system. An access control system enforces access based on predefined set of conditions. The access control system may be itself protecting access to resources or be a controlling module for a specialized system, like an identity management system or other system.

In systems today the conditions governing the access control rights are based on static configurations, rules, lists or other configuration information at the time the operation is being performed. For example, the user is part of a group who can perform operations to Read or Write the requested resource. In particular, a present state of an object, present status of an entity, etc is examined to determine if an operation should be allowed or denied. Thus, present access control systems are based on present status as opposed to a later status of an object or entity.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment is directed to a method practiced in a computing system, the method including acts for enforcing access control. The method includes receiving a request for an operation on one or more objects stored on computer readable media. One or more pre-operation states of the one or more objects, the pre-operation states being the state of the one or more objects when the operation is requested, are determined. One or more post-operation states of the one or more objects after the operation is performed on the one or more objects are determined. One or more access control rules are referenced. The access control rules control access to resources based on pre-operation state and post operation state. It can then be determined that the one or more access control rules allow the operation to succeed based on the one or more pre-operation states and the one or more post operation states. Note that this does not prevent the use of other rules for determining whether operations are allowed to succeed in addition to the state based rules. For example, embodiments may further allow the identity of a requester and what operation is being requested to be taken into account when determining whether operations are allowed to succeed or not. Based on determining that the one or more access control rules allow the operation to succeed, the operation is allowed to succeed.

Another method may be practiced in a computing environment and includes acts for defining access control rules. The method includes receiving user input at a computer implemented user interface selecting an operation to be performed on one or more objects. The method further includes receiving user input at the computer implemented user interface selecting one or more pre-operation states of the one or more objects. The pre-operation states define the state of the one or more objects when the operation is requested to be performed. The method further includes receiving user input at the computer implemented user interface selecting one or more post-operation states of the one or more objects. The one or more selected post operation states are operation states that the one or more objects would be in if the operation were allowed to succeed. One or more access control rules are defined for the operation. The access control rules control access to resources. Defining access control rules includes defining rules based on the one or more pre-operation states and the one or more post operation states. The method further includes storing the one or more access control rules, including information about the one or more pre operation states and the one or more post operation states, in a computer readable medium among a collection of access control rules.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 2A-2E illustrate various graphical user interface elements useful for defining policy rules;

DETAILED DESCRIPTION

Figure 1:
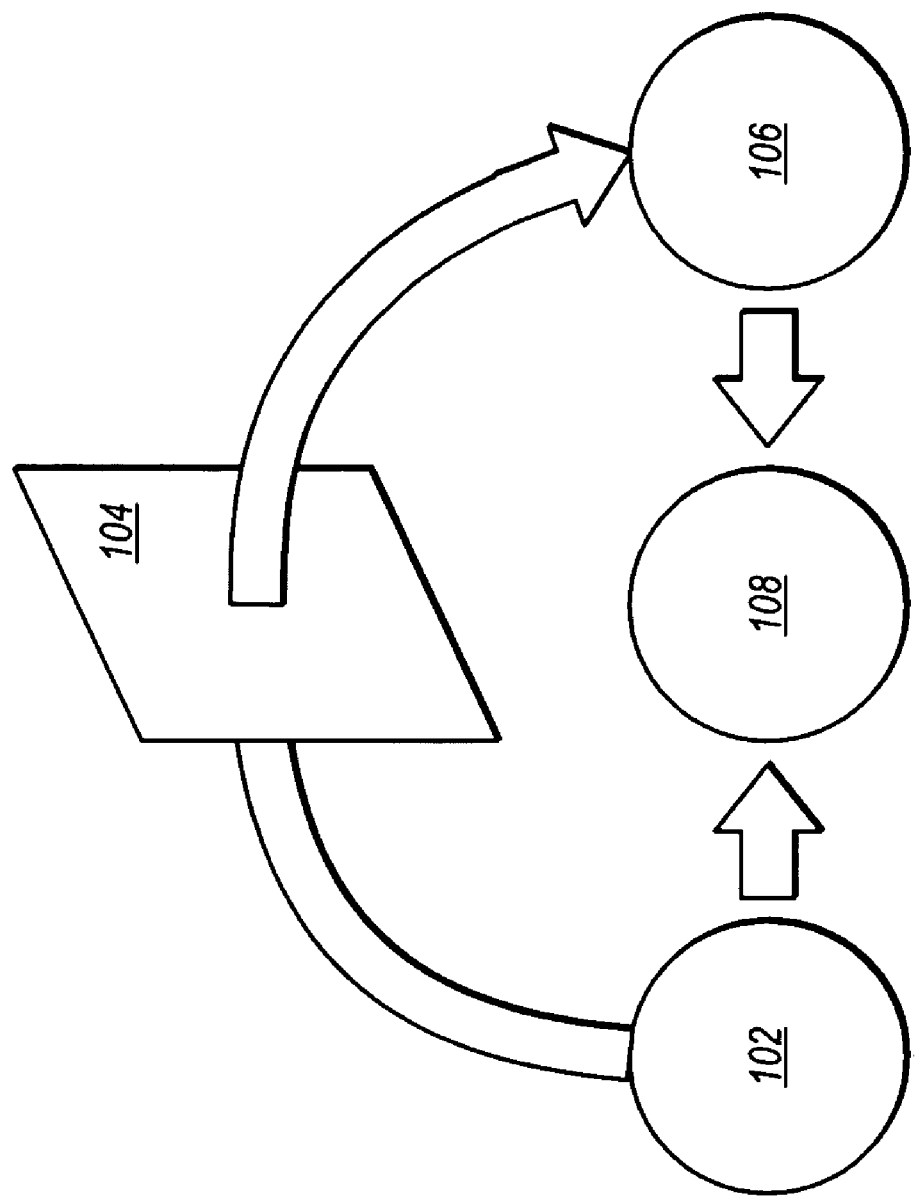
FIG. 1 illustrates comparison of an object before an operation and the object after the operation.

Some embodiments described herein implement a flexible system that can allow a user access to modify data and define policy for operations performed when operations on the data are requested, where the system can also constrain modifications to some subset states after the modification is completed. This is contrasted with traditional systems that focus on the state of the system at a time when an operation is being requested to be performed and a type of operation that is being requested and possibly its data. For example, in one embodiment, a request for an operation on an object may be received. Some embodiments allow for a comparison of the state of the object before the operation is performed on the object and the state of the object if the operation were allowed to succeed on the object. A determination is then made whether or not there exist one or more rules that allow the operation to succeed and proceed based on the comparison. Thus, some embodiments described herein may be referred to as a state transition based access control system. Additionally, some embodiments may be referred to as a processing system as well.

Embodiments can model access control rules by defining them in terms of the state and operational attributes at the time the operation is requested and also by including the post-operation state which should be satisfied for the access control rule to grant permission. The following illustrate a number of very specific examples of rules that may be implemented:

A rule may allow administrators to modify the policy data objects for a local administrative domain as long as the objects remain part of the local administrative domain set after the operation completes.

A rule may only allow users to modify their title, as long as the resulting title does not make them an executive.

A rule may allow users to self-modify their own user information as long as the result of the modifications does not change their discipline or title.

A rule may allow users to modify the group object definition as long as the group object is not changed into a security group object A rule may allow user information to be modified as long as the user object remains a contractor user object.

Embodiments may include functionality for defining and comparing object's previous state and current state as part of access control operation. Embodiments may include functionality for detecting a transition from current to after state of an object based on a requested operation as part of an access control check. Embodiments may include functionality for defining and storing the current and after state information together with permission rules. Embodiments may include a user interface that allows the definition of access control rules based on current and after states.

A state transition based access control system defines a mapping between a requested operation, its parameters and subjects to whom it applies together with the current and after state representations of the resources to which it is applied.

For example,
Operation=modify
Parameters=title of the employee
Requestors=all mid-level managers
Resource current set=All full time employees
Resource after set=All full time employees that are not executives In one example embodiment the resource current set and resource after set are implemented as a query. For example, "All full time employees" is defined as All user objects where userType=FTE." All full time employees that are not executives" is defined as All user objects where userType=FTE AND userTitle!="Executive". Other embodiments may implement this functionality in other ways.

When an access decision needs to be made, the system evaluates the request in the terms of the resource current set. If this matches, the system assumes the operation has been completed and evaluates the result state to see if it matches the resource after set. When both state conditions are satisfied, together with the operation and its parameters, and the identity of the requester, the operation may be granted.

The state transition access control system performs these operations on the defined permission rules in the system to calculate the access control rules for the requested operation. Based on these runtime calculations the system decides if permission should be granted.

The system can also be used to describe the access control rules for managing access to the rules themselves.

In some very specific embodiments, a unified rights and events, or ManagementPolicyRule is based on the concept that a single definition can be used to describe what is occurring in the system. That single definition will then be bound to grant permissions and define the workflows that should run as a response to the occurring operation.

An example of a simplified definition for the ManagementPolicyRule is as follows:
<ManagementPolicyRule>
    <PrincipalSet/>
    <Action/>
    <ActionParameter/>
    <ResourceCurrentSet/>
    <ResourceFinalSet/>
    <GrantRight/>
    <AuthenticationWorkflowDefinition/>
    <AuthorizationWorkflowDefinition/>
    <ActionWorkflowDefinition/>
</ManagementPolicyRule>

In the above definition, the first five elements define the condition when the management policy is applicable. For example, when FTE updates Group object's groupType attribute and the updated group is part of the distribute groups. This example would be expressed as:
<ManagementPolicyRule>
    <PrincipalSet>FTE Principal Set reference</PrincipalSet>
    <Action>Update</Action>
    <ActionParameter>groupType</ActionParameter>
    <ResourceCurrentSet>Set of all groups reference</ResourceCurrentSet>
    <ResourceFinalSet>Set of all distribution groups reference</ResourceFinalSet>
    <GrantRight/>
    <AuthenticationWorkflowDefinition/>
    <AuthorizationWorkflowDefinition/>
    <ActionWorkflowDefinition/>
</ManagementPolicyRule>

The remaining elements define the processing rules once this condition is met. In the following example, the permissions for this operation will be granted and an approval workflow is defined by group owners and all the group members are notified and the email system administrator is notified. This complete definition would now be:
ManagementPolicyRule>
    <PrincipalSet>FTE Principal Set reference</PrincipalSet>
    <Action>Update</Action>
    <ActionParameter>groupType</ActionParameter>
    <ResourceCurrentSet>Set of all groups reference</ResourceCurrentSet>
    <ResourceFinalSet>Set of all distribution groups reference</ResourceFinalSet>

<GrantRight/>true</GrantRight>
    <AuthenticationWorkflowDefinition/>
    <AuthorizationWorkflowDefinition/>Group owners approval workflow
    reference<ActionWorkflowDefintion/>
    <ActionWorkflowDefintion>Email system administrator notification
    workflow reference</ActionWorkflowDefinition>
</ManagementPolicyRule>

One very specific embodiment, not intended to limit the scope of other embodiments may include definitions for elements of a unified model as presented in the following table. Notably, other embodiments may include other definitions and requirements and different terminology. Additionally, the following elements may be instantiated as fields in a rule definition data structure. The fields do not need to be in any particular order, and when used herein, any ordering is only for explanatory purposes and should not be read to limit the data structure fields to a required ordering. The use of terms such as "first", "second", "third" etc. are only to distinguish different fields and do no specify or imply a required order.

| Attribute Name | Data Type | Multi-valued | Required | Notes |
| --- | --- | --- | --- | --- |
| PrincipalSet | Reference to a Set | No | No | This definition is a match iff the requesting principal is a member of the set specified. |
| Action | String | Yes | Yes | One or more of CREATE, READ, MODIFUPDATE, UPDATEINSERT, UPDATEREMOVE, UPDATECHANGE, DELETE. This definition is a match iff the request is one of the types specified in the Action element. |
| ActionParameter | String | Yes | No | Name of attributes to which this definition applies. The definition is matched by a request iff the request affects any of the attributes in this element. A value of "*" indicates all attribute. Applies to Create, Read, Modify, ModifyInsert, ModifyRemove. |
| ResourceCurrentSet | Reference to a Set | No | No | A reference to a Set. The definition is a match iff the resource targeted by the request is in the set specified by the reference or keyword before the request. Ignored for Create and must be set for all other. |
| ResourceFinalSet | Reference to a Set | No | No | A reference to a Set. The definition is a match iff the resource targeted by the request is in the set specified by the reference after the request. Ignored for Delete and Read (Get/Enum) operations. |
| GrantRight | Boolean | No | Yes | Boolean indicating if this definition is matched by the criteria listed above, then the permission will be granted to the PrinicipalSet to perform the action. False indicates this definition defines the management processes only without granting the right to the PrinicipalSet. |
| AuthenticationWorkflowDefinition | Reference to a Process | Yes | No | One or more references to a process object. If the conditions of this definition are met, then any processes specified in these elements must be run prior to any authZ processes, instantiation of the request, and action processes. Unhandled execution faults generated by any of the processes referenced here will result in an authentication denied fault, and will terminate |

| Attribute Name | Data Type | Multi-valued | Required | Notes |
| --- | --- | --- | --- | --- |
| | | | | further processing of the request. |
| AuthorizationWorkflowDefinition | Reference to a Process | Yes | No | One or more references to a process object. If the conditions of this definition are met, then any processes specified in these elements must be run prior to instantiation of the request, and action processes. Unhandled execution faults generated by any of the processes referenced here will result in an authorization denied fault, and will terminate further processing of the request. |
| ActionWorkflowDefinition | Reference to a Process | Yes | No | If the conditions of this definition are satisfied by the incoming request and the user has permissions to perform this operation, then the request is allowed. Further, if AuthN, AuthZ, processes are specified and completed, then the processes specified in this field as executed after the request is committed. |

Referring now to FIG. 1, an example of certain principles of some embodiments is illustrated. FIG. 1 illustrates an object in a pre-operation state (i.e. before a requested operation has been performed on the object) 102. A request may be received to perform an operation 104 on the object in the pre-operation state 102. A calculation may be performed to determine the post-operation state (i.e. the state of the object if the operation 104 were allowed to be performed on the object) 106.

FIG. 1 illustrates that a comparison is performed on the incoming request and rule definitions 108 is determined to match the request conditions and allows the operation 104 to be performed based on the pre-operation state of the object 102 and the post-operation state of the object 106. In particular, rule definition 108 has matched the requested operation 104, including the before and after states, and other rule defined qualifiers (such as identity of a requester, operation being requested, etc.). Having found a matching rule for the operation 104 allows the operation to proceed.

Administrators can define the state transition access control system through the systems user interface (UI) which models both the current and after operation states of the resource being acted on, together with the operations and its parameters and subjects to which it applies.

Figure 2D:

Referring now to FIGS. 2A-2E, an example user interface 200 is illustrated. The user interface 200 in this example includes a number of tabs that can be selected by user interaction to enable further user interaction with various user interface elements. FIG. 2A illustrates the state of the user interface 200 when a general information tab 202 is selected by a user. When the general information tab 202 is selected, the user interface 200, in this example, includes elements with which a user can interact including a name element 204 the description element 206 and a permissions element 208. The name element 204 allows a user to define a name for a policy rule. The description element 206 allows a user to provide a custom description describing the policy rule. The permissions element 208 allows a user to select whether or not the rule is one that grants permissions. In this example, when the permissions element 208 is set, permissions are granted to principals to perform actions when conditions of the rule are met. If the permissions element 208 is not set, only a management process is defined, without rights being granted.

A user can select the operations and users tab 210 (See FIG. 2B) by selecting the "Next" button 212 in the general information tab 202. The operations and users tab 210 includes an operations element 214, a principals element 216 and an attributes element 218. The operations element 214 allows a user to select the operations to which the rule applies. For example, a user can select what operations a principal will be allowed to perform when conditions are met. In the example illustrated, such operations may include: create, delete, read, modify, modify insert, or modify remove.

The principals element 216 allows a user to configure to whom (e.g. what users) the rule applies. As illustrated, in this example, this may be specified based on a specific set of users. For example, an object or list identifying objects corresponding to users may be specified. In some embodiments, the principles element 216 may be used to configure to whom the rule applies by specifying users in terms of principals as related to a resource. For example, the attributes of an object may be examined to determine principals.

The attributes element 218 can be used to select object attributes for a rule. In particular, a user may be given authorization to only perform actions on certain attributes of a resource. In the example illustrated, an administrative user may specify that a principal can perform specified operations on all attributes, or on selected specific attributes.

Access control rules may also allow for reflexivity, also referred to as reflexive rules. Reflexive rules allow definition where the requester is dynamic depending on what the target resource is. For example, one can define a single rule for all groups, where each group contains an attribute "owners" and the requester is defined as the "owner" of the group object. When a request is received, the user is granted access only if they are identified in the owner attribute of the group. Different groups may have different owners. But a single rule conveys this relationship. Other relationships can be expressed as long as the target object has a reference field to who the requesters can be. One can also do the inverse where the subject object has a reference to some object, and the resource object is defined in terms of the requester object. For example, a rule may be implemented where the requestor can modify their own user object data.

Selecting the "Next" button 212 in the operations and users tab 210 causes the selection of the condition before tab 220 (see FIG. 2C). This allows an administrative user to determine the state that a resource must be in before a request for an operation for the rule to be valid (e.g. object 102 in FIG. 1). In the example illustrated, this can be specified by specifying that the resource is part of a particular object set. A set is some collection of objects, either explicit or dynamically constructed or both explicit and dynamically constructed. In an alternative embodiment, this can be specified by specifying that the resource is defined as an attribute of the principal authorized to operate on the resource by the rule.

Selecting the "Next" button 212 in the condition before tab 220 selects the condition after tab 230 (see FIG. 2D). This tab 230 allows the user to select the state of a resource after an operation has been performed (e.g. object 106 in FIG. 1). As with the specification of the state of a resource before an operation is performed, this can be specified by specifying that the resource is part of a particular object set, or by specifying that the resource is defined as an attribute of the principal authorized to operate on the resource by the rule.

Figure 2E:
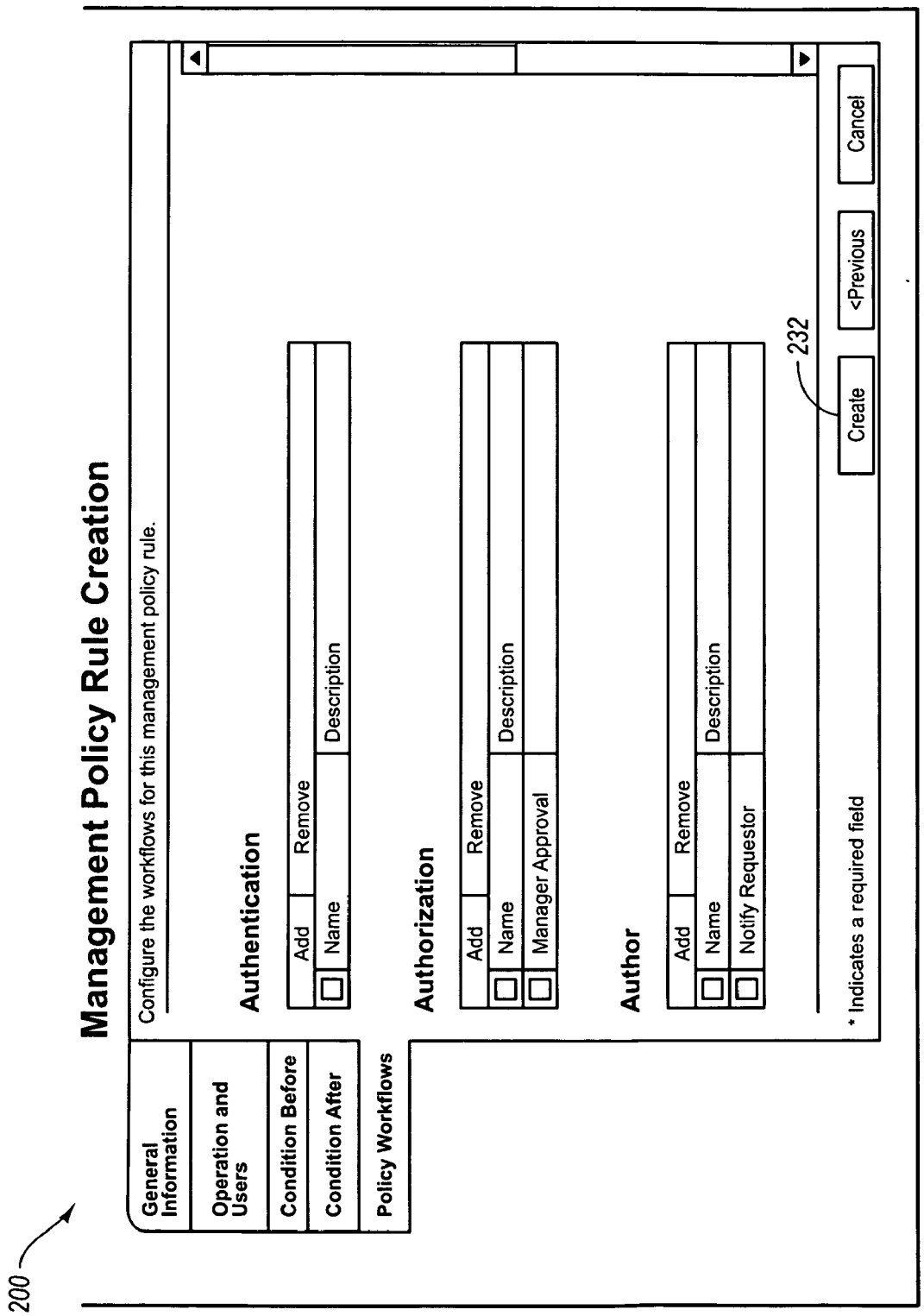

Selecting the "Next" button 212 in the condition after tab 230 selects the policy workflows tab 240 (see FIG. 2E). In the policy workflows tab 240, an administrative user can specify workflows that are performed as part of the policy rule. In the example illustrated, a user may specify authentication tasks, authorization tasks, and/or other action tasks.

Selecting the create button 232 causes the rule to be created and stored in a repository of rules. The repository can then be used to determine access control permissions for operations on resource objects.

The system can also be used to describe the access control rules for managing permissions to perform operations on various resources including permissions to the rules themselves.

The following discussion now refers to a number of methods and method acts that may be performed. It should be noted, that although the method acts may be discussed in a certain order or displayed in the Figures in a certain order, no particular ordering is necessarily required unless specifically stated, or required because an act is dependent on another act being completed prior to the act being performed.

Figure 3:
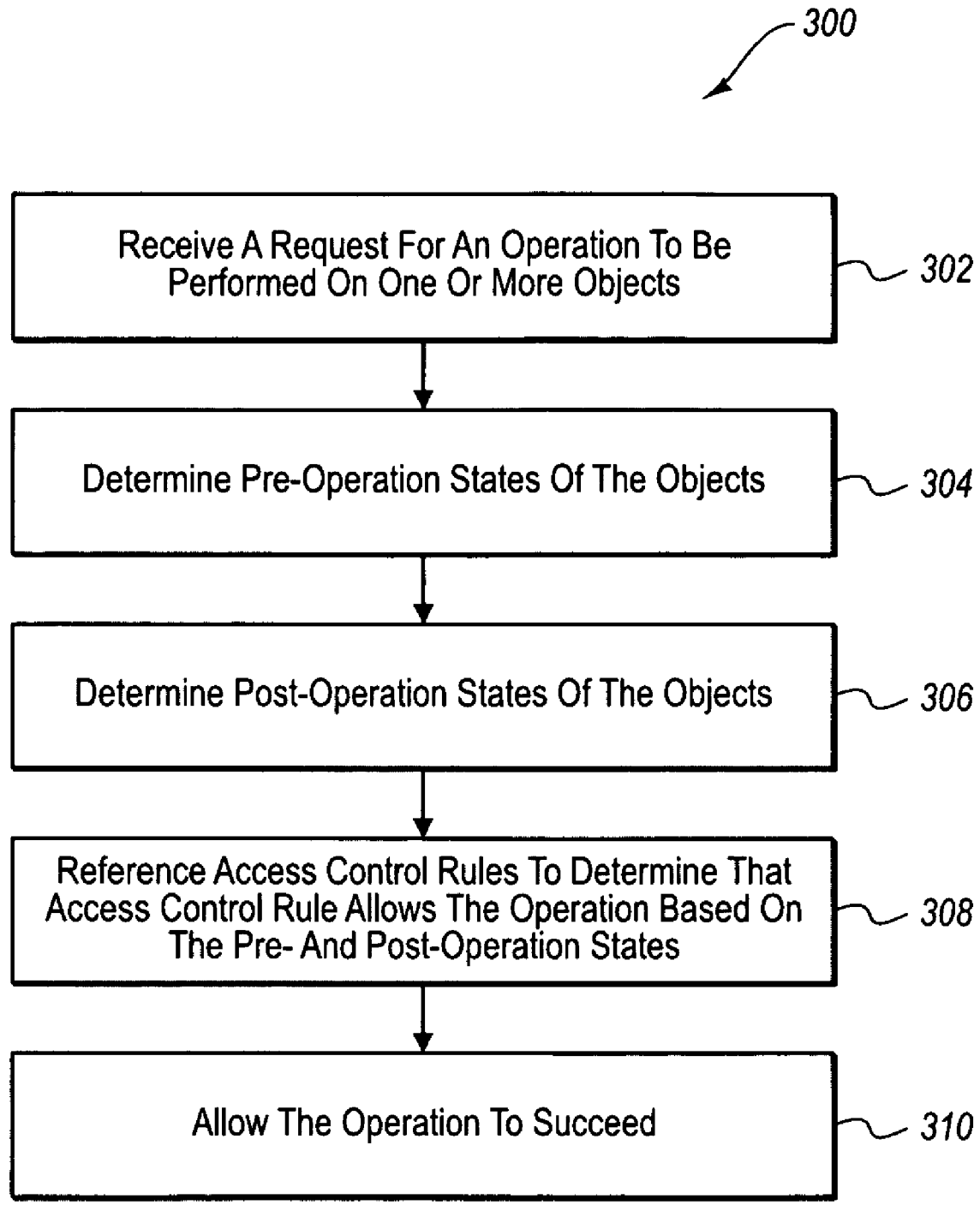
FIG. 3 illustrates a method of determining if an operation should be allowed to succeed.

Referring now to FIG. 3, a method 300 is illustrated. The method 300 may be practiced in a computing system and includes method acts for enforcing access control. The method includes receiving a request for an operation on one or more objects (act 302). The objects are stored on computer readable media. For example, objects may be implemented in volatile system memory of a computing system. Alternatively the objects may be stored on more permanent storage such as a computer hard drive, flash driver, or other media. A request may be received to perform an operation on the one or more objects. The operation, if performed on the one or more objects, would result in a change to how the objects are represented on the computer readable media. For example, the operation may result in changes to attributes, formatting, accessibility, etc. In the examples illustrated above, operations may be requested by administrators to modify the policy data objects for a local administrative domain. A user may request operations to modify a title attribute of an object associated with the user. Receiving a request for an operation on one or more objects may include receiving a request from an administrator to change objects associated with other users. For example, an administrator may request a change in objects being maintained and corresponding to other employees. Additionally or alternatively, receiving a request for an operation on one or more objects may include receiving a request from a user to change objects associated with the user themselves. For example, an employee may request changes to an object storing information about the employee themselves.

The method 300 further includes determining one or more pre-operation states of the one or more objects (act 304) when the operation is requested. As illustrated in FIG. 1, an objects pre-operation state as illustrated at 102 my be determined. This may be accomplished, in one example, by referencing attributes of the object 102.

The method 300 further includes determining one or more post-operation states of the one or more objects (act 306). The post-operation states represent the state of the objects after the operation is performed on the object. For example, if an operation is performed on an object, the object may have different attributes than if the operation was not performed on the object. FIG. 1 illustrates an example of an operation 104 being performed on an object 102 in a pre-operation state. FIG. 1 further illustrates the object 106 is a post-operation state after the operation has been performed on the object.

Notably, determining one or more post-operation states may be performed in a number of different ways. For example, in one embodiment, determining one or more post-operation states of the one or more objects if the operation were allowed to succeed includes examining the one or more objects after the operation has been performed on the one or more objects. In particular, an operation can actually be performed on an object such that the object will be in a post-operation state. This allows for quick determination of the post-operation state by simple inspection of the object. As will be described below changes to the object can be uncommitted such that they can be rolled back if rules do not allow for the operation to succeed. Otherwise, if rules do exist that allow the operations to succeed, the changes can be committed as will be described below.

In an alternative embodiment, determining one or more post-operation states of the one or more objects if the operation were allowed to succeed includes calculating one or more post-operation states. This can be performed without actual change to the object 102. Instead one or more computer processors can calculate a hypothetical post-operation object state which can be used.

The method 300 further includes referencing one or more access control rules, the access control rules controlling access to resources based on pre-operation state and post operation state. Determining that the one or more access control rules allow the operation to succeed can be performed based on the one or more pre-operation states and the one or more post operation states (act 308).

Access control rules may be generated from a number of different sources. For example, in one embodiment, the access control rules are pre-specified by an administrator. Further, an administrator may use a graphical user interface system for specifying access control rules. In particular, a system may display in a graphical user interface a model of an object in a first state. The system may further display in the graphical user interface a model of the object in a second state. The system may further receive user input linking the model of the object in the first state to the model of the object in the second state so as to create a state based access control rule based the first and second state.

As illustrated in FIG. 2B, the method 300 may further include an act of the system receiving user input at the graphical user interface specifying principals or entities for the access control rules. Further illustrated in FIG. 2B, the method 300 may further include acts of the system receiving user input at the graphical user interface specifying one or more operations for the access control rules.

The method 300 further includes based on determining that the one or more access control rules allow the operation to succeed, allowing the operation to succeed (act 310). Determining that the one or more access control rules allow the operation to succeed based on the one or more pre-operation states and the one or more post operation states may include finding a single rule specifying that the particular operation may succeed. For example, control rules may specify changes from a pre-operation state to a post-operation state that are allowed to occur. Any rule that allows the operation can be sufficient to allow the operation to succeed. Alternatively, determining that the one or more access control rules allow the operation to succeed based on the one or more pre-operation states and the one or more post operation states may include evaluating all rules a pre-defined plurality of rules defined in a computing system before permissions are granted. For example, some rules may specify changes from a pre-operation state to a post-operation state that are not allowed to occur. Thus, every rule is examined to ensure that no rules exist that specifically disallow a given change from a pre-operation state to a post-operation state.

In one alternative embodiment, the method 300 may be practiced by having rule precedence which determines the ordered list of rules applicable. Options can include having at least one rule allowing or disallowing controlling the outcome of the access check.

The method 300 may be practiced where allowing the operation to succeed includes granting permission to perform the operation. Subsequently, the operation is performed resulting in a change to the one or more objects stored on the computer readable media. This embodiment may be particularly useful when post-operation states are calculated for an object without actually performing the operation on the object itself.

In an alternative embodiment of the method 300, allowing the operation to succeed includes committing the operation, such that one or more changes to the one or more objects are ratified. In this way, subsequent requests for operations on the one or more objects are based on the operation after the one or more changes have been performed on the one or more objects. This embodiment may be particularly useful in embodiments where operations are actually performed on the object and then the objects state is determined after the operations are performed, as opposed to just calculating an objects expected post-operation state. If the change to the post-operation state is not allowed, then the changes can be rolled back to put the object in its pre-operation state such that subsequent operations are performed on the object in the pre-operation state.

Figure 4:
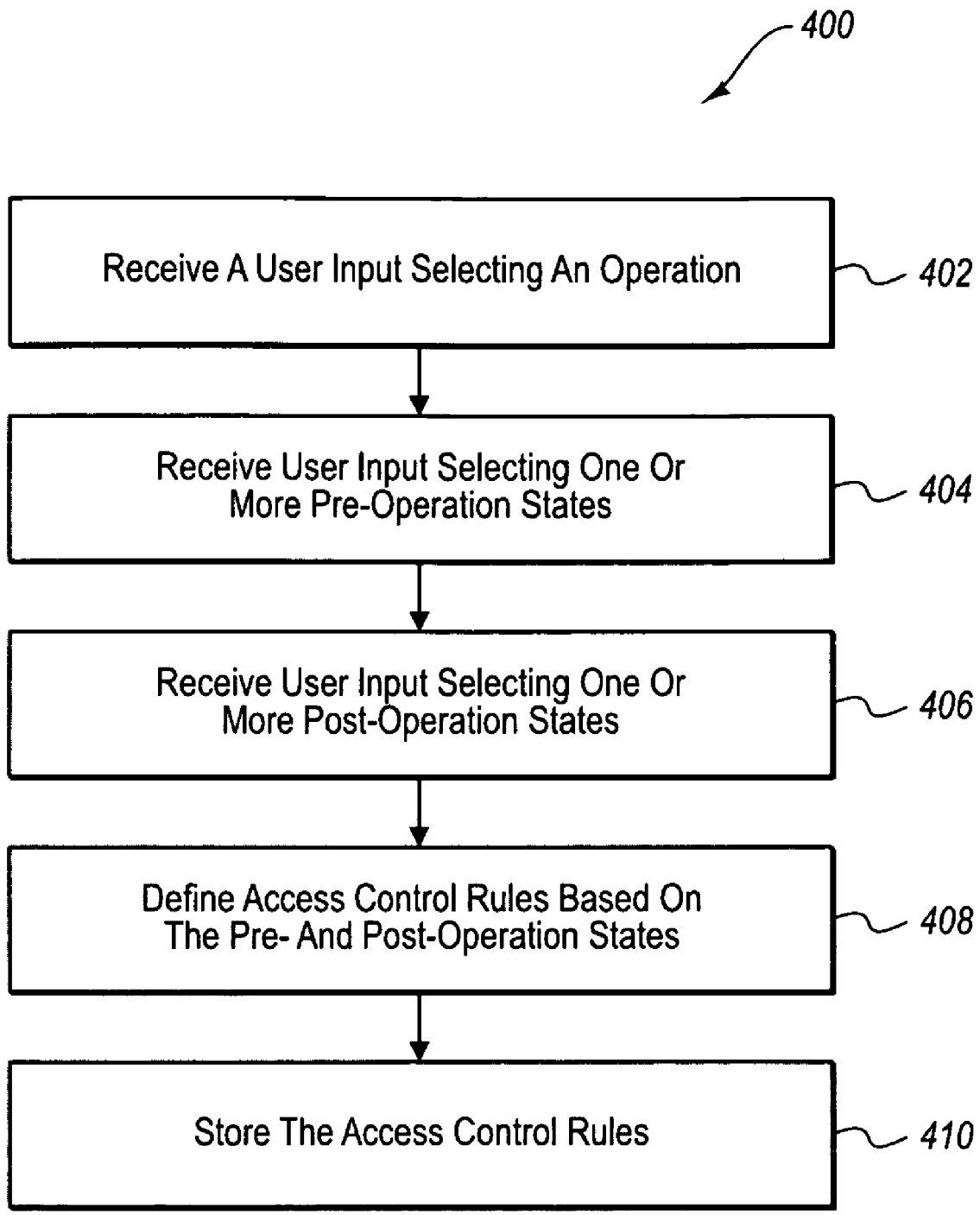
FIG. 4 illustrates a method of generating access control rules based on pre-operation state and post-operation state of an object.

Referring now to FIG. 4, another method 400 is illustrated. The method 400 may be practiced in a computing environment, and includes method acts for defining access control rules. The method 400 includes receiving user input at a computer implemented user interface. The user input selects an operation to be performed on one or more objects (act 402).

The method 400 further includes receiving user input at the computer implemented user interface selecting one or more pre-operation states of the one or more objects (act 404), the pre-operation states defining the state of the one or more objects when the operation is requested to be performed;

The method 400 further includes receiving user input at the computer implemented user interface selecting one or more post-operation states of the one or more objects (act 406), wherein the one or more selected post operation states are operation states that the one or more objects would be in if the operation were allowed to succeed;

The method 400 further includes defining one or more access control rules for the operation, the access control rules controlling access to resources (act 408), wherein defining access control rules comprises defining rules based on the one or more pre-operation states and the one or more post operation states; and The method 400 further includes storing the one or more access control rules (act 410), including information about the one or more pre operation states and the one or more post operation states, in a computer readable medium among a collection of access control rules. Additional information may be stored as well, such as rule properties defining operation type, requester, other parameters, etc.

Embodiments of the present invention may comprise or utilize a special purpose or general-purpose computer including computer hardware. For example, the embodiments described previously may be implemented using computing system comprising appropriate hardware and/or software including processors, memory, storage, operating systems, application software or other hardware or software. Additionally components may be implemented on each their own separate stand-alone computer system including individualized hardware where the machines are interconnected through network communication channels or other communication channels. Alternatively, components may be implemented on a common shared computer system, where the machines share resources, such as processor resources, memory resources, storage resources, or other resources.

Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system, a method of enforcing access control based on a comparison between pre-operation state and post-operation state, the method comprising:
an act of a computer system, which includes one or more processors, receiving a request from a principal to perform an operation that modifies at least one attribute of each of one or more objects stored on computer readable media;
an act of the computer system determining one or more pre-operation states of the at least one attribute of each of the one or more objects at a time when the operation is requested by the principal;
an act of the computer system calculating one or more post-operation states of the at least one attribute of each of the one or more objects if the operation were allowed to succeed on the one or more objects;
subsequent to the computer system calculating the one or more post-operation states, an act of the computer system comparing the one or more pre-operation states of the at least one attribute of each of the one or more objects and the one or more post operation states of the at least one attribute of each of the one or more objects to determine one or more changes the operation would make to the at least one attribute of each of the one or more objects if the operation were allowed to succeed;
an act of the computer system referencing one or more access control rules, the access control rules controlling access by the principal to the one or more objects based on changes the principle is permitted to make to attributes of the one or more objects;
based on the computer system referencing the one or more access control rules, an act of the computer system determining that the one or more access control rules would allow the operation to succeed on behalf of the principal based on the principal being permitted to make the one or more changes to the at least one attribute of each of the one or more objects between the one or more pre-operation states and the one or more post operation states; and
based on the computer system determining that the one or more access control rules would allow the operation to succeed on behalf of the principal, an act of the computer system allowing the operation to succeed.

2. The method of claim 1, wherein the access control rules are pre-specified by an administrator.

3. The method of claim 1, wherein at least a portion of the one or more access control rules are reflexive such that determining that the one or more access control rules would allow the operation to succeed on behalf of the principal further comprises determining that the principal is authorized to perform the operation on the one or more objects based on a dynamic definition of the principal based on a relationship of the principal and the one or more objects.

4. The method of claim 2, wherein the access control rules are pre-specified by an administrator using a system that performs the following:
displaying, in a graphical user interface, a model of an object in a first state;
displaying, in the graphical user interface, a model of the object in a second state; and
receiving user input linking the model of the object in the first state to the model of the object in the second state so as to create a state based access control rule based the first and second state.

5. The method of claim 4, wherein the system receives user input at the graphical user interface specifying principals or entities for the access control rules.

6. The method of claim 4, wherein the system receives user input at the graphical user interface specifying one or more operations for the access control rules.

7. The method of claim 4, wherein the system stores the state based access control rule for later use in access control verification.

8. The method of claim 4, wherein the first state is a state prior to the operations occurring and the second state is a state after the operations occur.

9. The method of claim 1, wherein at least a portion of the control rules specify changes from a pre-operation state to a post-operation state that are allowed to occur.

10. The method of claim 1, wherein at least a portion of the control rules specify changes from a pre-operation state to a post-operation state that are not allowed to occur.

11. The method of claim 1, wherein receiving a request for an operation on one or more objects comprises receiving a request from an administrator to change objects associated with other users.

12. The method of claim 1, wherein receiving a request for an operation on one or more objects comprises receiving a request from a user to change objects associated with the user themselves.

13. The method of claim 1, wherein determining that the one or more access control rules would allow the operation to succeed on behalf of the principal comprises evaluating all rules in a pre-defined plurality of rules defined in a computing system before permissions are granted.

14. The method of claim 1, wherein calculating the one or more post-operation states of the at least one attribute of each of the one or more objects if the operation were allowed to succeed on the one or more objects comprises performing the operation on the one or more objects without committing the operation, and wherein allowing the operation to succeed comprises committing the operation, such that one or more changes to attributes of the one or more objects are ratified and such that subsequent requests for operations on the one or more objects are based on the operation after the one or more changes have been performed on the one or more objects.

15. The method of claim 1, wherein calculating one or more post-operation states of the at least one attribute of each of the one or more objects if the operation were allowed to succeed on the one or more objects comprises calculating one or more hypothetical post-operation states.

16. The method of claim 1, wherein calculating one or more post-operation states of the at least one attribute of each of the one or more objects if the operation were allowed to succeed on the one or more objects comprises examining the one or more objects after the operation has been performed on the one or more objects prior to committing the operation.

17. In a computing environment, a method of defining access control rules, the method comprising:
 receiving user input, at a computer implemented user interface, selecting an operation to be performed on one or more objects;
 receiving user input, at the computer implemented user interface, selecting one or more pre-operation states of attributes of the one or more objects, the pre-operation states defining the state of the attributes of the one or more objects at a time when the operation is requested to be performed;
 receiving user input, at the computer implemented user interface, selecting one or more post-operation states of the attributes of the one or more objects, wherein the one or more selected post operation states are operation states that the attributes of the one or more objects would be in if the operation were allowed to succeed on the one or more objects, the one or more post-operation states used by computer system applying the access control rules to determine whether a requested operation, if permitted, would result in the one or more post-operation states, prior to allowing requested operation to be committed;
 defining one or more access control rules for the operation, the access control rules controlling access to resources, wherein defining the one or more access control rules comprises defining rules that identify one or more changes that the operation is permitted to make to the attributes of the one or more objects to modify the one or more pre-operation states of the attributes of the one or more objects to arrive at the one or more post operation states of the attributes of the one or more objects;
 receiving user input specifying one or more principals that may perform operations permitted by the one or more access control rules; and
 storing the one or more access control rules, including information about the one or more changes that the operation is permitted to make to the attributes of the one or more objects to change the one or more pre-operation states to the one or more post operation states and the one or more principals that may perform operations permitted by the one or more access control rules, in a computer readable medium among a collection of access control rules.

18. The method of claim 17 further comprising:
 receiving user input specifying one or more tasks to be performed if conditions of the one or more access control rules are met; and
 storing the one or more tasks as part of the one or more access control rules.

19. In a computing environment, a physical computer storage device comprising a computer readable data structure storing an access control rule for controlling operations performed on one or more resources, wherein the computer readable data structure comprises:
 a first field, wherein the first field is used by a computer system to obtain a listing of one or more operations that may be performed on the one or more resources by one or more principals when conditions for the access control rule are met;
 a second field, wherein the second field is used by the computer system to obtain a listing of the one or more principals, the one or more principals being entities permitted to perform the one or more operations when conditions for the access control rule are met;
 a third field, wherein the third field is used by the computer system to obtain a listing of one or more attributes of the one or more resources, the attributes being attributes on which the one or more principals perform the one or more operations;
 a fourth field, wherein the fourth field is used by the computer system to obtain a listing of one or more pre-operation states defining one or more states of the one or more attributes of the one or more resources at a time when a request to perform the one or more operations on the one or more attributes of the one or more resources is made by one of the one or more principals, wherein the one or more attributes of the one or more resources must be in the one or more pre-operation states prior to the time when the request to perform the one or more operations is made for the conditions of the access control rule to be met;
 a fifth field, wherein the fifth field is used by the computer system to obtain a listing of one or more permitted post-operation states defining one or more permitted states of the one or more attributes of the one or more resources after the one or more operations are performed, wherein the one or more attributes of the one or more resources must be in the one or more post-operation states after the one or more operations are performed for the conditions of the access control rule to be met, the one or more post-operation states used by the computer system, prior to allowing one or more requested operations to be committed, to determine whether the one or more requested operations would result in the one or more post-operation states; and
 a sixth field, wherein the sixth field is used by the computer system to obtain a definition one or more tasks that are performed if the conditions of the access control rule are met.

* * * * *